United States Patent [19]

Mikawa

[11] Patent Number: 4,982,998
[45] Date of Patent: Jan. 8, 1991

[54] TWO PIECE CONSTRUCTION WHEEL FOR AN AUTOMOBILE

[75] Inventor: Ryozo Mikawa, Yokohama, Japan

[73] Assignee: Fortran Co., Ltd., Yokohama, Japan

[21] Appl. No.: 341,321

[22] Filed: Apr. 21, 1989

[51] Int. Cl.$^5$ .............................................. B60B 23/06
[52] U.S. Cl. ................................. 301/11 R; 301/63 D
[58] Field of Search ............... 301/9 R, 10 R, 10 DC, 301/11 R, 62, 63 R, 63 D, 64 SD, 65, 9 DN

[56] References Cited

U.S. PATENT DOCUMENTS

| | | | |
|---|---|---|---|
| 1,586,545 | 6/1926 | Williams | 301/11 R X |
| 1,880,641 | 10/1932 | Woodward | 301/9 DN X |
| 2,294,256 | 8/1942 | Uber | 301/11 R |
| 2,476,766 | 7/1949 | Potter et al. | 301/11 R |
| 2,553,891 | 5/1951 | Brosick | 301/63 D X |
| 3,897,113 | 7/1975 | Walther et al. | 301/11 R X |
| 4,325,422 | 4/1982 | Corner et al. | 301/98 X |

FOREIGN PATENT DOCUMENTS

| | | | |
|---|---|---|---|
| 3316738 | 11/1984 | Fed. Rep. of Germany | 301/11 R |
| 2491397 | 4/1982 | France | 301/10 R |
| 459785 | 9/1968 | Switzerland | 301/63 D |

*Primary Examiner*—Russell D. Stormer
*Attorney, Agent, or Firm*—Kanesaka and Takeuchi

[57] ABSTRACT

A two piece construction wheel for an automobile is formed of a rim integrally formed and a center disk separately formed. Connecting sections are installed at the position where the rim and the center disk abut against each other. A connecting section at the side of the rim is formed in the shape of a female screw and without penetrating through the connecting section and is engaged with other connecting section by screwing bolts. And also it is possible to connect with bolts and nuts or rivets and the like by piercing through the connection sections without installing the shape of a female screw.

3 Claims, 2 Drawing Sheets

TWO PIECE CONSTRUCTION WHEEL FOR AN AUTOMOBILE

BACKGROUND OF THE INVENTION AND RELATED ART STATEMENT

The present invention relates to a two piece construction wheel for an automobile having a rim and a center disk separately formed.

Hitherto, a two piece wheel for an automobile has adopted a method in which flanges for welding are installed at a center disk and integrally connected to a rim by welding after the center disk is engaged with the internal circumference of the rim. And there has been antother method in which flanges for fixation with piercing holes for the insertion of bolts are fixed to the rim by welding and piercing holes are also drilled at the center disk so that the rim and the center disk are connected together by bolts and nuts.

However, fixation of a rim and a center disk by welding directly or indirectly has following problems in the structure of a two piece wheel for an automobile.

Welding is the most popularly utilized technique for the connection of similar metals as it is possible to reduce costs. It is, however, rather difficult to maintain certain level of quality such as strength of welding and accuracy in dimension, and in case of mass production of the same kind, it is possible to control diversity of the quality to some extent by the use of a special welding machine after finding out the optimum conditions in experiment. However, it is the general tendency to manufacture a small number and various kinds of products since the design (ordinally, the center disk) is the sales point of the two piece wheel for an automobile. The special welding machine for which time for preparation is necessary for each kind of product must be used, which results in the cost up factor adversely from the cost down factor through the cut off of the working hours which is one of its proper purposes. While the special welding machine is, unfortunately, inadequate an machine for the assembly of the two piece wheel for automobile in manufacturing a small number and various kinds of products, it is actually very difficult to assemble without such special machine.

Further, when either of a rim or a center disk of the two piece wheel for an autombile is damaged, the whole must be replaced, and such replacement was non-economical in the meaning of saving resources. And further, in an automobile equipped with a brake caliper of larger scale having much braking power, which is adopted specially in a front engine and front drive automobile, since the welding section and flange section for welding of the center disk or a prominence of other material for fixation are formed in the two piece wheel for an automobile, it can not be used for these automobiles.

As mentioned above, the present invention is to solve such problems as unevenness of quality in welding, low productivity of assembly in the manufacture of a small number and various kinds of products and difficulty of use to an automobile equipped with a brake caliper of larager scale due to mechanical structure of the connected section, which were shown in the two piece wheel asembled by the hitherto welding technique. The object of the present invention is to provide a two piece construction wheel for automobile which has merit in assembly and can be used to an automobile equipped with a brake caliper of larger scale with much braking power adopted recently to a front drive and front engine automobile.

SUMMARY OF THE INVENTION

The above mentioned problems are solved by the two piece construction wheel wherein in a two piece wheel for an automobile having a rim integrally formed and a center disk separately formed, connecting sections are installed at a position where the rim and the center disk abut against each other, and the connecting section at the side of the rim is formed in the shape of a female screw, which does not penetrate therethrough. The connecting sections are connected by srewing bolts. And it is possible to connect with bolts and nuts or rivets and the like by piercing through the connection section without forming the shape of a female screw. Further if one connecting section is equipped with an air valve, then it becomes needless to install a hole for an air valve at the center disk, which are necessary in the past. And as the result, a center disk can be designed freely and variously.

DETAILED DESCRIPTION OF PREFERRED EMBODIMENTS

Hereinafter, appropriate examples of the invention are explained in detail with reference to the attached drawing.

Figure 1:
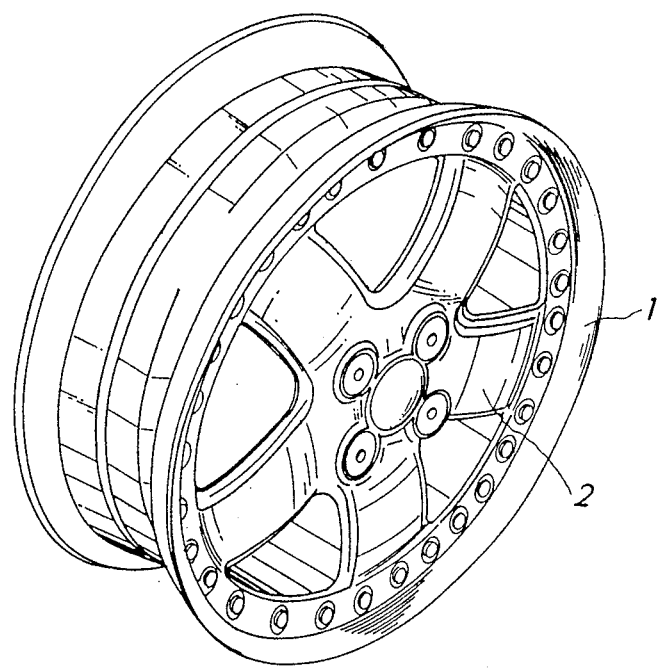
FIG. 1 shows a perspective view of a general shape of a two piece wheel for an automobile.

FIG. 1 shows a perspective view of general shape of a two piece wheel for an automobile.

Figure 2:
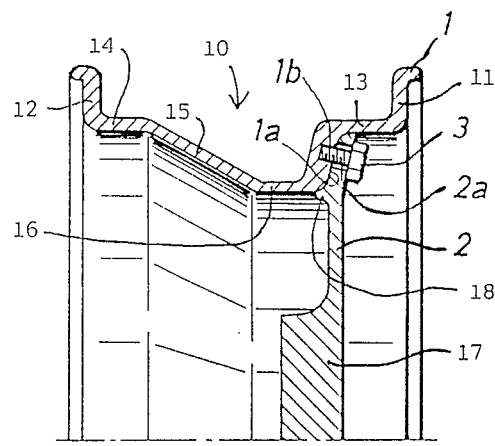
FIG. 2 shows a partial cross-sectional view of a two piece construction wheel for an automobile of one example of the present invention.

FIG. 2 shows a cross sectional view of a two piece wheel for an automobile with reference to one example of this invention.

In FIG. 2, an appropriate number of first connecting sections 1b with a shape of a female screw, which do not pierce through, are installed at the side of internal circumference 1a in a concave section of the rim 1 integrally formed with such metal materials as aluminum, and the center disk 2 also made of such metal as aluminum formed by casting and forging techniques and other forming methods is connected to the side of internal circumference 1a of the concave section. At the circumference of the center disk, i.e. the position corresponding to the first connecting section 1b of the rim 1, a second connecting section 2a is installed . The two piece construction wheel for an automobile is completed by inserting and clamping the bolt 3 in the first connecting section 1b.

In particular, the rim 1 is formed of a cylindrical portion 10 and two flanges 11, 12 integrally formed together as one unit. The flanges 11, 12 are formed at axial ends of the cylindrical portion 10 to extend radially outwardly therefrom.

The cylindrical portion 10 includes cylindrical first and second outer sections 13, 14. The first connecting section 1b is fixed to an inner end of the first outer section 13, while an oblique section 15 is fixed to an inner end of the second outer section 14 to extend radially inwardly of the rim. An intermediate cylindrical section 16 is situated between the first connection section 1b and the oblique section 15.

The first connecting section 1b extends radially inwardly from the inner end of the first outer section 13 in the direction away from the first outer section 13 at an angle close to a plane perpendicular to an axis of the rim 1. The oblique section 15 inclines at an angle smaller than the angle of the first connection section 1b relative to the first outer section 13. Therefore, the first connecting section 1b is located close to the flange 11 on the first outer section 13.

The center disk 2 includes a central portion 17, around which the second connecting section 2a is situated. The center disk 2 is provided with a projection 18 situated between the central portion 17 and the second connecting section 2a to surround the central portion 17. The second connecting section 2a inclines relative to the central portion 17.

Therefore, when the first and second connecting sections 1b, 2a about against each other, the center disk 2 orients perpendicular to the axis of the rim. At that time, the projection 18 engages the intermediate cylindrical section 16, and the outer periphery of the second connecting section 2a abuts against the first connecting section 1b.

Figure 3:
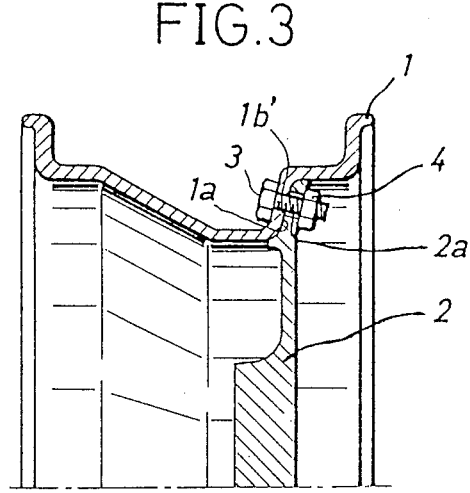
FIG. 3 shows a partial cross-sectional view of the two piece construction wheel for an automobile of another example of the present invention.

FIG. 3 shows another example of the invention of the two piece construction wheel for an automobile in which connecting hole 1b' of the rim 1 can be pierced instead of the shape of a female screw at the connectiong section 1b and it can be clamped and connected by nut 4 after the insertion of bolt 3 into the connecting sections 2a at the side of the center disk. Though it is not shown in the figure, a rivet or the like can be used instead of the bolt 3. In both examples, one of the bolts or the rivets can be replaced with a valve.

By the present invention, the flange for welding at the side of the center disk, which is indispensable for the connection by welding of the rim and the center disk of the two piece wheel for an automobile or the flange for indirect connection by a bolt and a nut installed at the side of the rim, are entirely needless and it becomes possible to reduce parts hitherto used therein. As the results thereof, efficiency of fuel and improvement in operability in driving are expected. Since there exists no impedent prominence such as flange for welding at the section of internal circumference of the rim, it becomes possible to install it to an automobile equipped with a brake caliper of larger scale and to maintain high safety such as very high accuracy of dimension in connection and less diversity of balance in weight without any diversity of strength of connection which has existed in case of the manufacture of small number and various kinds of products. Arbitrary materials can be used since it is not necessary to use the same material for a rim and a center disk in case of the connection by a bolt and therefore it is possible to disassemble and assemble again. It is very economical since only a damaged part can be replaced when either of a rim or a center disk is damaged. In the assembly process, it can be assembled through the simple work of clamping bolts which does not need any special skilled technique. As any expensive equipment such as welding machine is not necessary, it can be assembled at any factory or place and it becomes possible to realize high productivity with maintaining high yield rate.

When one of the bolts or rivets is replaced by a valve, a hole for taking out the valve on the rim and the center disk which was necessary in the past becomes needless and the center disk can be designed freely and variously.

As mentioned above, the present invention makes it possible to offer a two piece construction wheel for an automobile in all respects such as safety, economical efficiency, productivity in assembly and applicability.

What is claimed are:

1. A wheel for an automobile comprising:
    a cylindrical rim including a cylindrical portion and two flanges integrally formed together as one unit, said two flanges being formed at axial ends of the cylindrical portion to extend radially outwardly therefrom, said cylindrical portion including cylindrical first and second outer sections with inner and outer ends, respectively, a first connecting section fixed to the inner end of the first outer section, an oblique section fixed to the inner end of the second outer section and extending radially inwardly of the rim, and an intermediate cylindrical section situated between end portions of the first connecting section and the oblique section, said first connecting section extending radially inwardly from the inner end of the first outer section in the direction away from the first outer section at an angle close to a plane perpendicular to an axis of the cylindrical rim, and said oblique section being inclined at an angle smaller than an angle of the first connecting section relative to the first outer section so that the first connecting section is located close to the flange on the first outer section,
    a center disk adapted to be situated inside the cylindrical rim, said center disk having a central portion, a second connecting section with an outer periphery thereof located outside and around the central portion, and a projection situated between the central portion and the second connecting section to surround the central portion, said second connecting section being inclined relative to the central portion so that when the first and second connecting sections abut against each other, the center disk orients perpendicular to the axis of the cylindrical rim, the projection engages the intermediate cylindrical section of the cylindrical rim and the outer periphery of the second connecting section abuts against the first outer section of the cylindrical rim, and
    a plurality of connecting means for connecting the cylindrical rim and the center disk at the first and second connecting sections.

2. A wheel according to claim 1, wherein the first connecting section is made thicker than the rest of the cylinder rim, and the cylinder rim is provided with a plurality of screw holes at the first connecting section which do not penetrate therethrough, said center disk having a plurality of holes at the second connecting section, and said connecting means being bolts, said bolts passing through the holes of the center disk and engaging the screw holes so that the center disk is firmly connected to the cylindrical rim.

3. A wheel according to claim 1, wherein the cylindrical rim is provided with a plurality of holes at the first connecting section, said center disk having a plurality of holes at the second connecting section, and said connecting means being bolts and nuts, said bolts passing through the holes of the rim and center disk and engaging the nuts so that the center disk is firmly connected to the cylindrical rim.

* * * * *